United States Patent
Sylvain

(10) Patent No.: US 8,401,568 B2
(45) Date of Patent: *Mar. 19, 2013

(54) PROVIDING LOCATION-BASED INFORMATION IN LOCAL WIRELESS ZONES

(75) Inventor: Dany Sylvain, Gatineau (CA)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/233,524

(22) Filed: Sep. 15, 2011

(65) Prior Publication Data

US 2012/0003994 A1 Jan. 5, 2012

Related U.S. Application Data

(63) Continuation of application No. 10/745,836, filed on Dec. 24, 2003, now Pat. No. 8,046,000.

(51) Int. Cl.
*H04Q 1/00* (2006.01)
(52) U.S. Cl. ............... 455/456.3; 455/456.1; 455/456.2
(58) Field of Classification Search .............. 455/404.2, 455/414.1, 414.2, 422.1, 456.1, 456.2, 456.3, 455/456.4, 456.5, 456.6
See application file for complete search history.

(56) References Cited

U.S. PATENT DOCUMENTS

| | | | |
|---|---|---|---|
| 5,969,678 A | 10/1999 | Stewart | |
| 6,633,547 B1 | 10/2003 | Akatsu | |
| 7,123,875 B1 | 10/2006 | Marko | |
| 7,483,944 B2 | 1/2009 | Parupudi | |
| 7,617,317 B2 | 11/2009 | Jones | |
| 7,647,055 B2 * | 1/2010 | Gum et al. ................ | 455/456.1 |
| 2002/0046090 A1 * | 4/2002 | Stewart ........................... | 705/14 |
| 2002/0137526 A1 | 9/2002 | Shinohara | |
| 2002/0151313 A1 | 10/2002 | Stead | |
| 2003/0171112 A1 | 9/2003 | Lupper | |
| 2004/0092271 A1 | 5/2004 | Viikari | |
| 2004/0203863 A1 | 10/2004 | Huomo | |
| 2004/0203890 A1 | 10/2004 | Karaoguz | |
| 2005/0059410 A1 | 3/2005 | Trossen | |
| 2005/0085187 A1 | 4/2005 | Jendbro | |
| 2005/0169214 A1 | 8/2005 | Suomela | |
| 2005/0277418 A1 | 12/2005 | Singhal | |
| 2008/0161018 A1 | 7/2008 | Miller | |
| 2010/0200242 A1 | 8/2010 | Rodger et al. | |

FOREIGN PATENT DOCUMENTS

| | | |
|---|---|---|
| GB | 2374254 A | 10/2002 |
| JP | 2001359172 A | 12/2001 |
| JP | 2002291020 A | 10/2002 |
| JP | 2003016347 | 1/2003 |
| WO | 9904582 | 1/1999 |

(Continued)

OTHER PUBLICATIONS

Office Action mailed Nov. 2, 2005 for U.S. Appl. No. 10/745,836.

(Continued)

*Primary Examiner* — Jean Gelin
(74) *Attorney, Agent, or Firm* — Wolfe-SBMC

(57) ABSTRACT

The present invention allows mobile terminals to receive location-based information upon entering a local wireless zone established by an access point. The access point includes or is associated with one or more servers, which may provide the location-based information and control access. The local wireless zone is a limited area in which communications between the access point and the mobile terminal are possible. Once the mobile terminal enters into one or more local wireless zones, the presence of the mobile terminal in the local wireless zone is detected. Once detected, the mobile terminal is afforded access to a server on which the location-based information is stored. The server is associated with the local wireless zone.

28 Claims, 9 Drawing Sheets

FOREIGN PATENT DOCUMENTS

WO           03007553          1/2003

OTHER PUBLICATIONS

Office Action mailed May 3, 2006 for U.S. Appl. No. 10/745,836.
Examiner's Answer mailed May 4, 2007 for U.S. Appl. No. 10/745,836.
Decision on Appeal mailed Mar. 3, 2009 for U.S. Appl. No. 10/745,836.
Office Action mailed Jun. 19, 2009 for U.S. Appl. No. 10/745,836.
Office Action mailed Dec. 16, 2009 for U.S. Appl. 10/745,836.
Notice of Allowance mailed Sep. 14, 2011 for U.S. Appl. No. 10/745,836.
"Examiner's Answer", U.S. Appl. No. 10/745,836, (Jul. 23, 2007),45 pages.
"Foreign Office Action", Canadian Application No. 2551624, (Aug. 6, 2012),2 pages.
"International Search Report and Written Opinion", Application No. PCT/IB2004/003450, (Mar. 31, 2005),9 pages.
"Non-Final Office Action", U.S. Appl. No. 10/745,836, (Dec. 9, 2010),9 pages.
"Notice of Panel Decision from Pre-Appeal", U.S. Appl. No. 10/745,836, (Oct. 1, 2010),2 pages.
Schulzrinne, et al., "Ubiquitous Computing in Home Networks", *IEEE Communications Magazine*, (Nov. 2003),pp. 128-135.

* cited by examiner

PROVIDING LOCATION-BASED INFORMATION IN LOCAL WIRELESS ZONES

RELATED APPLICATIONS

The present application is a continuation of co-pending U.S. patent application Ser. No. 10/745,836, filed Dec. 24, 2003, entitled "PROVIDING LOCATION-BASED INFORMATION IN LOCAL WIRELESS ZONES."

FIELD OF THE INVENTION

The present invention relates to communications, and in particular to providing location-based information to mobile terminals within local wireless zones in which communications with the mobile terminal are possible.

BACKGROUND OF THE INVENTION

Given the significant amount of information available over packet-based networks and the ease with which such information can be delivered wirelessly to mobile users, significant efforts have been made to provide information to mobile users based on their relative locations. Location-based information services may provide information such as advertising for local businesses, providing directions, or providing other information based at least in part on the location of the user.

Despite the apparent usefulness of such location-based services, these services have yet to gain popularity. One hindrance to the acceptance of location-based services has been the relative inaccuracy of cellular-based tracking techniques used to determine the location of the user. Cellular systems may use triangulation techniques among proximate based stations, or may simply identify the location of the user based on the base station currently serving the user. The triangulation and base station identification techniques for determining user location are unable to provide a relatively high degree of resolution for location determination. In mot instances, the location of the user can only be determined at best within 50 meters or more, depending on the layout of the cellular network. With such poor resolution in determining a user's location, the association of services with a particular location is very limited.

Other location-determining systems incorporate Global Positioning System (GPS) equipment in the mobile terminal. Unfortunately, the addition of more accurate positioning equipment to mobile devices is expensive and often requires extensive upgrades to the cellular network to take advantage of the more accurate positioning information. Accordingly, there is a need for an efficient and effective way to provide location-based information to mobile users. There is a further need to provide a way to determine the location of the mobile user with greater accuracy, such that the location-based information provided to the mobile user is more specific to the actual location of the mobile user.

SUMMARY OF THE INVENTION

The present invention allows mobile terminals to exchange location-based information upon entering a local wireless zone established by an access point. The access point includes or is associated with one or more servers, which may provide the location-based information and control access. The local wireless zone is a limited area in which communications between the access point and the mobile terminal are possible. Once the mobile terminal enters into one or more local wireless zones, the presence of the mobile terminal in the local wireless zone is detected. Once detected, the mobile terminal is afforded access to a server on which the location-based information is stored. The server is associated with the local wireless zone. In one embodiment, an IP address is provided to the mobile terminal, which can use the IP address to access the location-based information. If the mobile terminal is within multiple local wireless zones at any given time, location-based information for a particular local wireless zone may be selected. The mobile terminal will then establish communications with the access point for the selected local wireless zone, and request the location-based information from the associated server.

By using local wireless communications and associating servers and location-based information with each local wireless zone, the location-based information can be better configured for the area encompassed by the local wireless zone. In one embodiment, a host configuration protocol, such as the Dynamic Host Configuration Protocol, is used to provide configuration information to the mobile terminal to allow the mobile terminal to communicate with various entities associated with the access point. The configuration information may be provided in light of a zone identifier, which is associated with at least one of the local wireless zones. The configuration information may be used to gain access to the server providing the location-based information. Alternatively, the configuration information may directly provide an IP address for accessing the location-based information. The location-based information may be various types of information to facilitate any number of services, such as web services; communications, including voice call, video call, instant messaging, email, voicemail, and fax; file transfer; streaming media; real-time media applications; electronic commerce transactions; user authentication; and geo-location services.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a mobile terminal capable of communicating over a local wireless interface to readily access content based on the relative location of the mobile terminal. The content is generally referred to as location-based information, because the location of the mobile terminal plays a role in determining what content is made available to the mobile terminal. The location-based information may be the only content provided to any mobile terminal at a certain location, or various types of content may be provided in light of specific location information. In essence, when a mobile terminal comes within communication range of a local wireless interface, location-based information may be provided to the mobile terminal. Additional factors or information provided by the mobile terminal may assist in determining new location-based information to provide to the mobile terminal. Thus, the present invention creates a close association between a local wireless zone in which communications with the mobile terminal are possible and a content server, so that a mobile terminal entering the local wireless zone can readily access the content server and receive the location-based information. Prior to delving into the details of the present invention, an overview of exemplary communication environments is provided.

Figure 1:
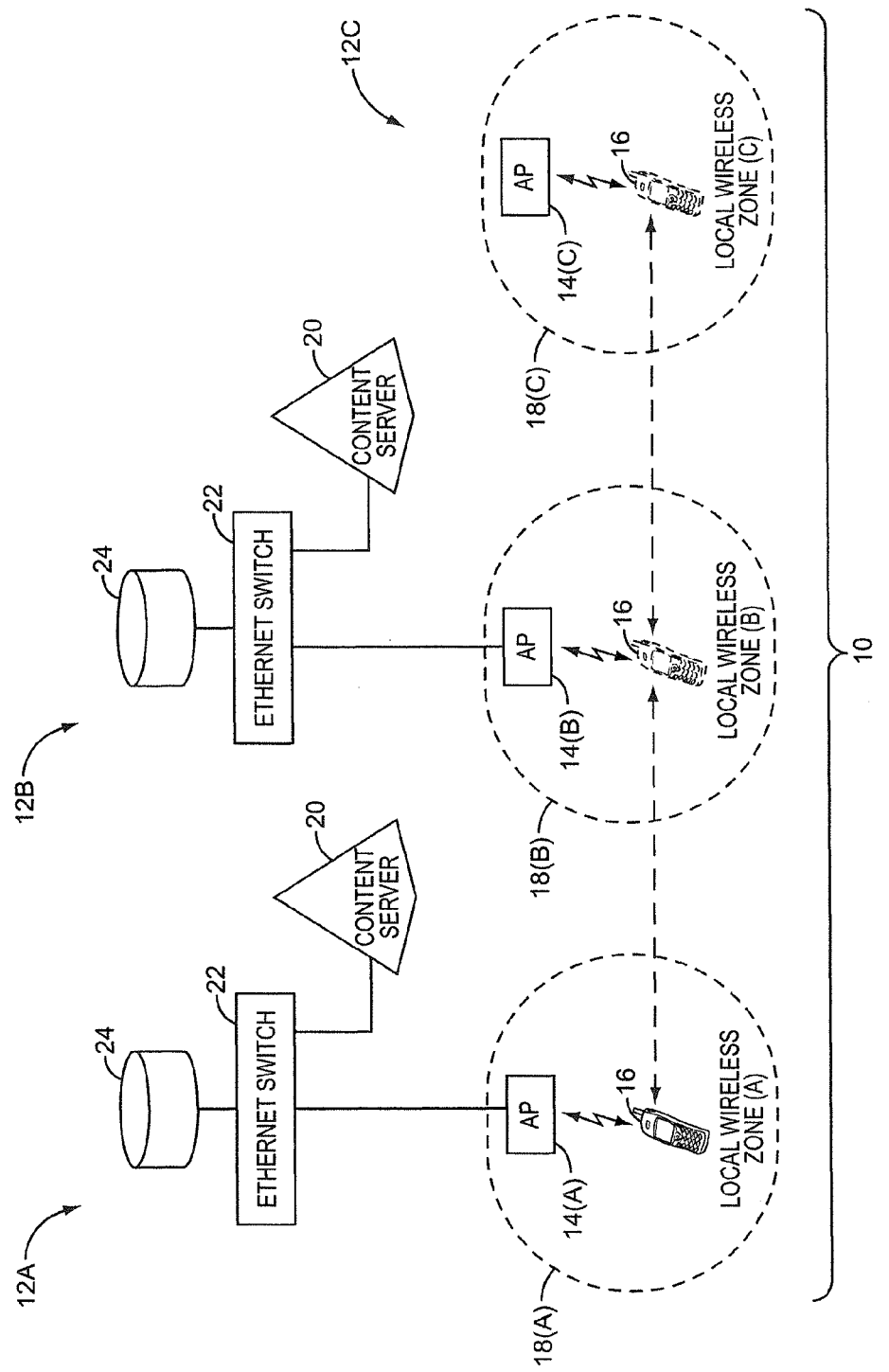
FIG. 1 is a block representation of a communication environment having three independent and non-overlapping local wireless zones according to a first embodiment of the present invention.

With reference to FIG. 1, a communication environment 10 is illustrated as having three independent local wireless systems 12A, 12B, and 12C capable of facilitating local wireless communications. Local wireless communications are defined as limited-range wireless communications, such as those used in wireless local area network (WLAN), Bluetooth, and other limited-range communication technologies. For the purposes of illustration, the embodiments specifically described herein may incorporate WLAN communication techniques as defined in the IEEE 802.11 and 802.15 standards. Those skilled in the art will recognize other applicable local wireless communication technologies that provide wireless communications in ranges substantially smaller than those provided by traditional cellular technologies.

Each of the local wireless systems 12A, 12B, and 12C includes an access point 14A, 14B, 14C, which may facilitate wireless communications with a mobile terminal 16 when the mobile terminal 16 is within a corresponding one of local wireless zones 18A, 18B, 18C. In the embodiment illustrated in FIG. 1, the local wireless zones 18A, 18B, 18C do not overlap, and the mobile terminal 16 will only be able to communicate with one of the access points 14A, 14B, 14C at any given time, and only when it is in with a local wireless zone 18A, 18B, 18C.

Each of the local wireless systems 12 is independent and configured to allow location-based information to be delivered to the mobile terminal 16 when the mobile terminal 16 is within one of the respective local wireless zones 18. Given the limited range for local wireless communications afforded by each of the access points 14, the location of the mobile terminal 16 is known to a high degree of specificity when communications with an access point 14 are possible. Thus, the location-based information provided to the mobile terminal 16 within a given local wireless zone 18 can be very specific, given the known location of the mobile terminal 16.

To facilitate the delivery of the location-based information to the mobile terminal 16, the local wireless system 12 is able to recognize that the mobile terminal 16 is within a local wireless zone 18 afforded by an access point 14, provide access to the mobile terminal 16, and then deliver the location-based information to the mobile terminal 16. As illustrated, local wireless systems 12A and 12B include a stand alone content server 20 for providing the location-based information, wherein the content server 20 is coupled to the access points 14A and 14B through a dedicated Ethernet switch 22 or other local network (not shown). Access to the local wireless systems 12A and 12B by the mobile terminal 16 is governed by access servers 24. The access servers 24 may take the form of Authentication, Authorization, and Accounting (AAA) servers, Dynamic Host Configuration Protocol (DHCP) servers, or Domain Name Service (DNS) servers. Those skilled in the art will recognize other types of servers and corresponding protocols through which authorization, accounting, address provisioning, and address translation can be provided. Notably, all of these functions are not required to practice the present invention, but are beneficial in select embodiments as will be described in further detail below. Further, the various access servers 24 and the content server 20 may take various forms and may be implemented as functions in a variety of devices.

As illustrated with respect to the local wireless system 12C, the functionality of the access servers 24 and the content servers 20 may be integrated within the access point 14C, wherein only a single access point 14C is required to provide the local wireless zone 18, control access by the mobile terminal 16, and provide location-based information to the mobile terminal 16. Determinations as to whether the mobile terminal 16 is within the local wireless zones 18, and thus capable of communicating with the respective access points 14, are generally provided within the respective local wireless communication protocol used to facilitate the local wireless communications.

For the communication environment 10 of FIG. 1, the independent local wireless zones 18 generally indicates that only one local wireless system 12 can service the mobile terminal 16 any given time. As such, the location-based information may be configured accordingly, and selection of the location-based information may be automatic once the mobile terminal 16 enters the local wireless zone 18 or based on information received from the mobile terminal 16.

Figure 2:
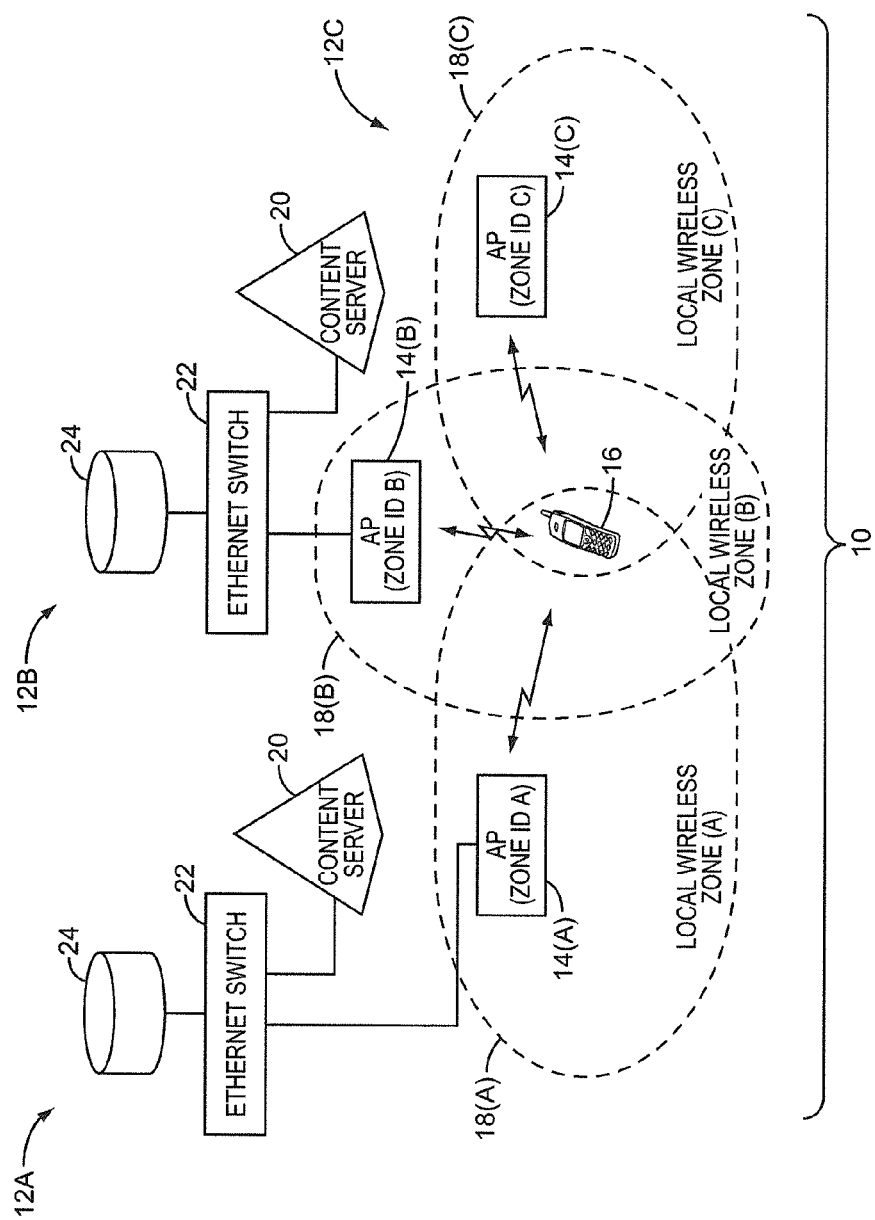
FIG. 2 is a block representation of a communication environment having three independent and overlapping local wireless zones according to a second embodiment of the present invention.

With reference to FIG. 2, the local wireless systems 12 are still independent of one other, yet the local wireless zones 18 afforded by each of the local wireless systems 12 overlap one another. As illustrated, the mobile terminal 16 is within local wireless zones 18A, 18B, and 18C, and thus can communicate with each of the access points 14A, 14B, 14C at the same time. When local wireless zones 18 from different local wireless systems 12 overlap, each local wireless zone 18 or access point 14 may be associated with a respective zone ID: ZONE ID A, ZONE ID B, and ZONE ID C, for local wireless systems 12A, 12B, and 12C, respectively. Accordingly, each access point 14 or an associated component in the respective local wireless system 12 can provide the zone ID to the mobile terminal 16, such that the mobile terminal 16 or the user thereof can select the local wireless system 12 from which the location-based information is received. The zone ID may be used by the mobile terminal 16 to help identify or otherwise control the location-based information provided from the corresponding local wireless system 12. As will be described further below, the local wireless zones 18 may have unique zone identifiers (IDs), or may share the same zone ID, depending on the configuration of the communication environment 10 as well as the local wireless systems 12.

Figure 3:
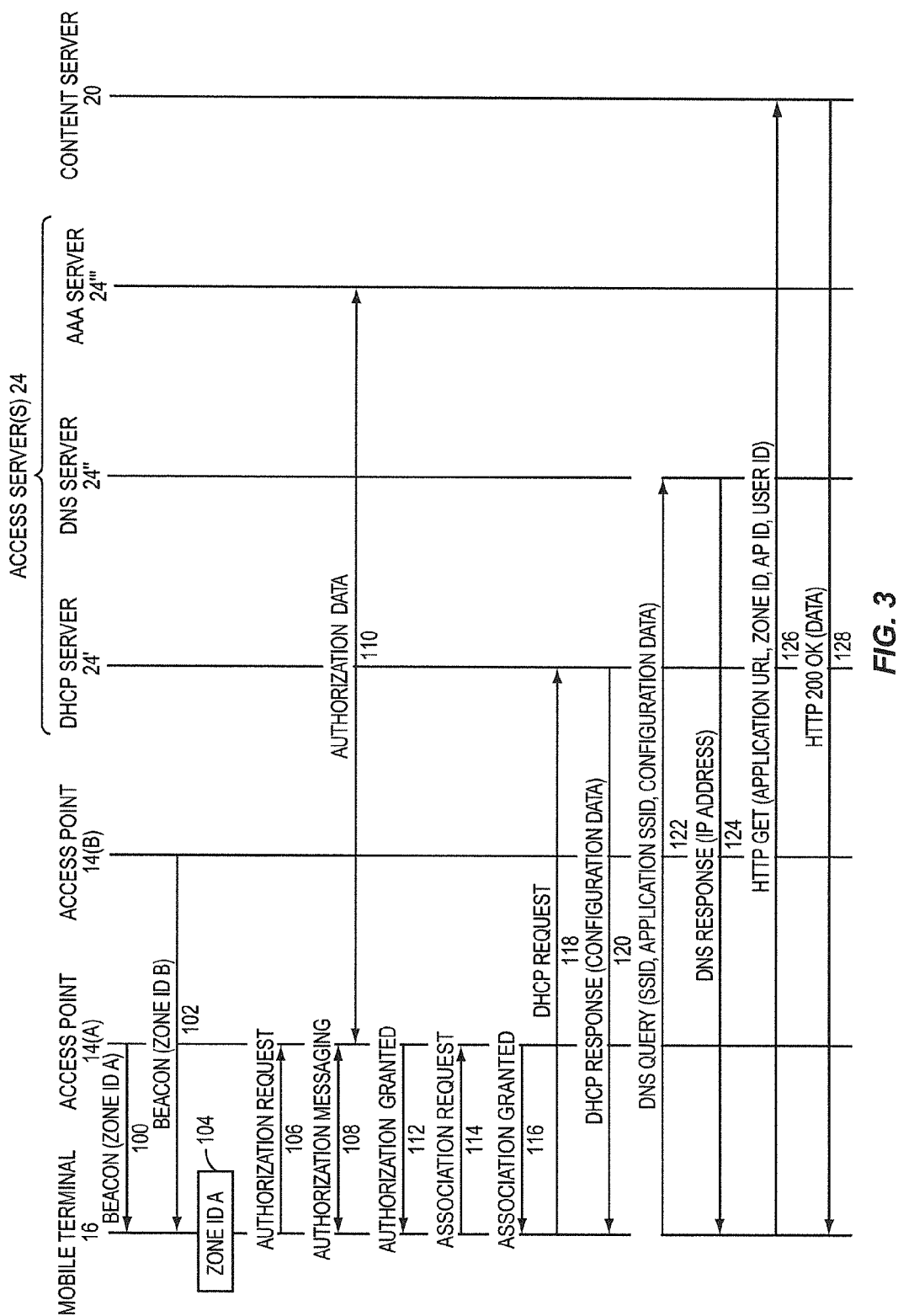
FIG. 3 is a communication flow illustrating operation of the present invention according to the communication environment of FIG. 2.

Turning now to FIG. 3, a communication flow diagram is provided to illustrate operation of one embodiment of the present invention, in light of the communication environment 10 of FIG. 2. Assume that the mobile terminal 16 is positioned such that it is within the local wireless zones 18A and 18B of local wireless systems 12A and 12B, respectively, but not within the local wireless zone 18C. Notably, the access server 24 may actually be multiple servers or a single device providing multiple server functions. In this example, the access server(s) 24 takes the form of a DHCP server 24', a DNS server 24", and a AAA server 24'".

The authorization and establishment of communications between the mobile terminal 16 and access point 14A may be configured such that any user may establish communications wherein the user is effectively anonymous, or the authorization messaging may require a specific user to initiate communications. In the latter case, the authorization request or messaging would include a user ID or other credentials, such as a password, to assist in authenticating the user or mobile terminal 16 for communications. Given the type of available location-based information and the nature of the local wireless system 12, the decision to allow anonymous users to establish communications may be decided on a case-by-case basis. When a specific authorization process is required, the MA server 24'" or equivalent function may be accessed by the access point 14A to provide authorization data received from the mobile terminal 16 to obtain authorization for establishing communications between the mobile terminal 16 and the access point 14A.

On an ongoing basis, the access points 14A and 148 will send out signals to assist the mobile terminal 16 in determining that it is within the respective local wireless zones 18A and 18B. For wireless LAN embodiments, these signals are referred to as "beacons" and may include the respective zone IDs: ZONE ID A and ZONE ID B. Thus, access point 14A will send a beacon identifying ZONE ID A to the mobile terminal 16 (step 100), and access point 14B will send a beacon identifying ZONE ID B to the mobile terminal 16 (step 102). When present in the local wireless zones 18(A) and 18B, the mobile terminal 16 will receive the beacons from access points 14A and 14B, and will recognize that communications with access points 14A and 14B are possible. The mobile terminal 16 may provide this information to the user through an appropriate user interface. Either based on a response from the user or automatically, the mobile terminal 16 will select one of the access points 14A or 14B with which to communicate. Such selection may directly or indirectly involve selecting one of the zone IDs. In this example, assume that the mobile terminal selects ZONE ID A, which is associated with access point 14A (step 104). Accordingly, the mobile terminal 16 will send an authorization request to access point 14A to authorize local wireless communications (step 106). The mobile terminal 16 and access point 14A will exchange the requisite authorization messaging to obtain the requisite information necessary to authorize a communication session therebetween (step 108). The access point 14(A) may cooperate with the AAA server 24'" to determine whether to authorize communications with the mobile terminal (step 110). Assuming that the user is authorized, access point 14A will send a message to the mobile terminal 16 indicating that the authorization for the communication session is granted (step 112).

For wireless LAN applications, an association is generally established between the mobile terminal 16 and the serving access point 14A. Thus, the mobile terminal 16 may send an association request to the access point 14A (step 114), which will respond with an association granted message when the association is granted (step 116). Next, the mobile terminal 16 may send a DHCP request to the DHCP server 24' or equivalent function (step 118) to obtain the DHCP configuration data, such as an Internet Protocol (IP) address for the mobile terminal 16 to use for communications within local wireless system 12A, and optionally an address for the content server 20 from which the location-based information may be requested. The DHCP server 24' will send a DHCP response with the configuration data and perhaps the address for the content server 20 back to the mobile terminal 16 (step 120). Those skilled in the art will recognize other host configuration protocols to use when initializing the mobile terminal 16 for communications with the local wireless system 12.

Depending on how the configuration data is provided to the mobile terminal 16, a DNS service may be used to find the IP address of the desired or default content server 20. For example, if the configuration data provided by the DHCP server 24' took the form of a domain name, the mobile terminal 16 may send a DNS query to a DNS server 24" (step 122), which will send a DNS response with the IP address of the content server 20 back to the mobile terminal (step 124). The DNS entry of the DNS query may take numerous forms, and may represent or include various types of information, such as the zone ID provided in the form of a domain name. For example, the zone ID for a "restaurant" could be configured as www.restaurant.com. The DNS entry could also be a modified zone ID, such as wlan.www.restaurant.com. Further, the DNS entry may be derived from virtually any type of information provided in the configuration data received from the DHCP server 24'.

Regardless of whether the IP address for the content server 20 is provided with the configuration data, obtained from the DNS service, or received from any other device, including the access point 14A, the mobile terminal 16 can use the IP address to request the location-based information from the content server 20 (step 126). For example, the request may take the form of a Hypertext Transfer Protocol (HTTP) Get message. Further, virtually any type of information may be provided with the HTTP Get message, including a Uniform (or Universal) Resource Locator (URL) associated with the application, the zone ID, an access point identifier, and a user identifier. Various location-specific or user-specific data can be exchanged with the content server 20 as necessary to obtain or provide the desired location-based information. Based on the request, the content server 20 will respond with the location-based information, preferably in the form of an HTTP 2000K message (step 128). At this point, the content server 20 is acting as a traditional web server, and the mobile terminal 16 is acting as a traditional client running a browser. Thus, the content may be provided to the mobile terminal 16 with links to additional content made available by the content server 20 or other accessible server. The location-based information may be provided in association with any number or type of services, which are a function of the location of the mobile terminal.

As seen from the above, the mobile terminal 16 can determine that it is within a local wireless zone 18 of an access point 14, and take the necessary steps to establish the ability to communicate with the access point 14, interact with any necessary access servers 24 to obtain authorization for further communications, and perhaps information pertaining to the content server 20, and then use the information pertaining to the content server 20 to access location-based information. The location-based information may be further specified using a zone ID, an access point ID, a user ID, other information provided by the mobile terminal 16, or a combination thereof.

Figure 4:
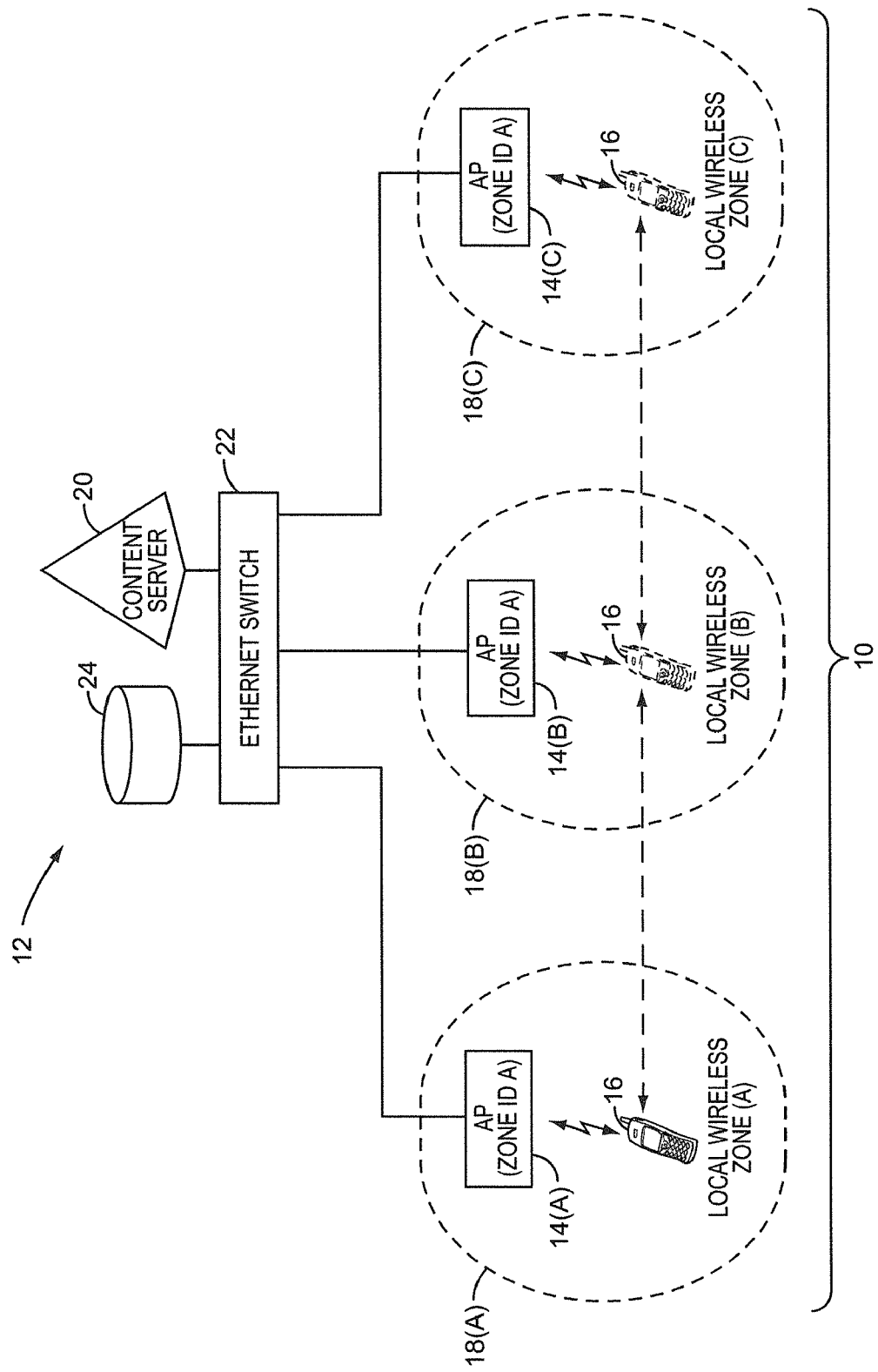
FIG. 4 is a block representation of a communication environment having three independent and non-overlapping local wireless zones according to a third embodiment of the present invention.

With reference to FIG. 4, a communication environment 10 according to a third embodiment of the present invention is illustrated. In this embodiment, multiple (three) access points 14 are supported by a common content server 20, access server 24, and Ethernet switch 22. By providing multiple access points 14 in a local wireless system 12, a larger area may be covered by the respective local wireless zones 18 provided by the access points 14. In this embodiment, each access point 14 or local wireless zone 18 is associated with the same zone ID (ZONE ID A). Further refinement of the location-based information may be based on an access point ID, which is uniquely associated with each of the respective access points 14. Thus, if the access point ID is not provided to the content server 20, more generalized location-based information will be provided to the mobile terminal 16. If the access point identifier or other identifier associated with the particular local wireless zone 18 is provided to the content server 20, more specific location-based information may be provided to the mobile terminal 16.

Figure 5:
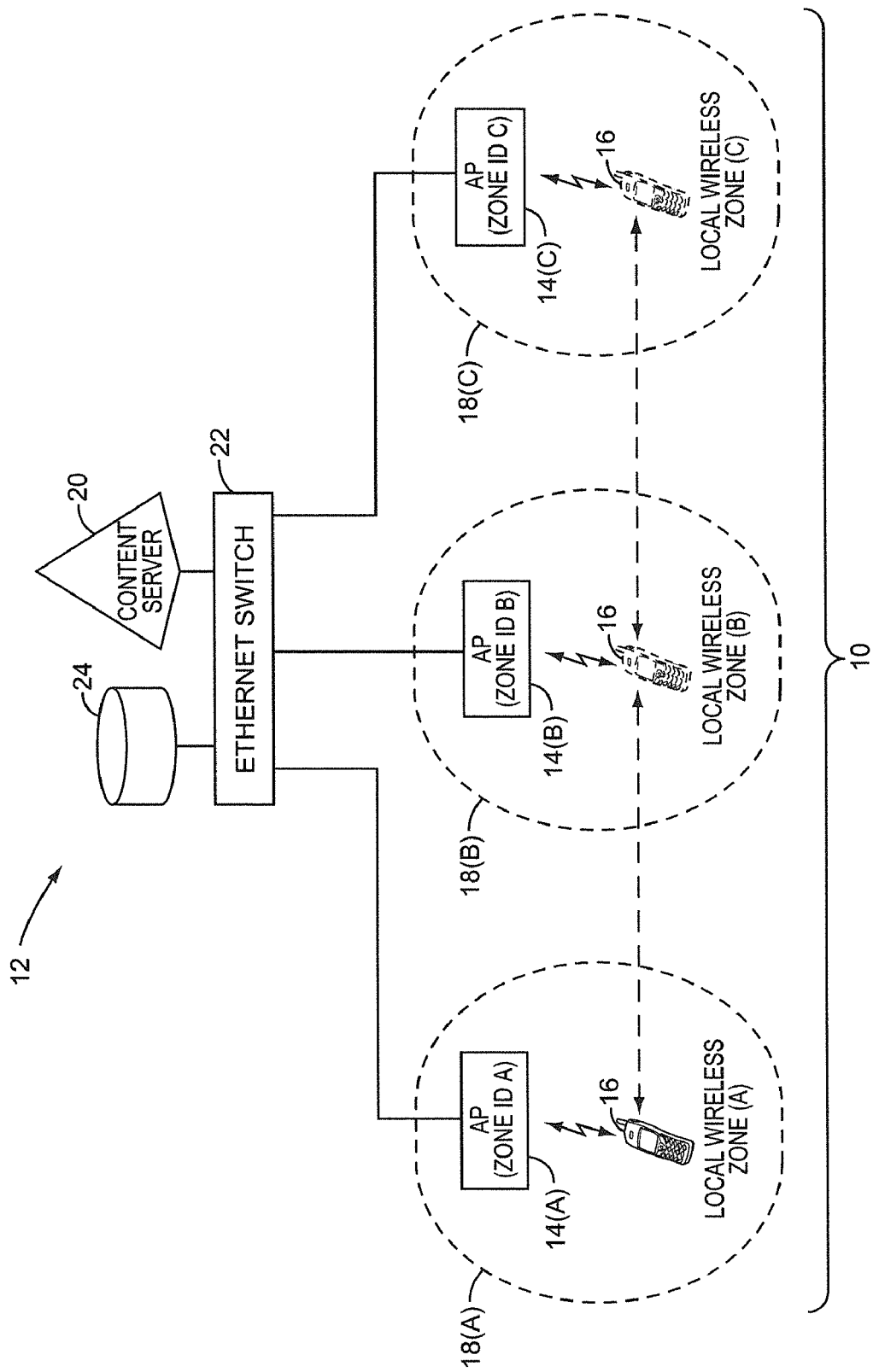
FIG. 5 is a block representation of a communication environment having three independent and non-overlapping local wireless zones according to a fourth embodiment of the present invention.

With reference to FIG. 5, a fourth embodiment of the present invention is illustrated. In this embodiment, each local wireless zone 18 is associated with a unique zone ID, which may be used by the mobile terminal 16 to select the location-based information from the content server 20. In this embodiment, a common content server 20 and access server 24 support each of the three unique local wireless zones 18. Alternatively, each access point 14 may have a unique identifier, which is used to select the location-based information from the content server 20.

Figure 6:
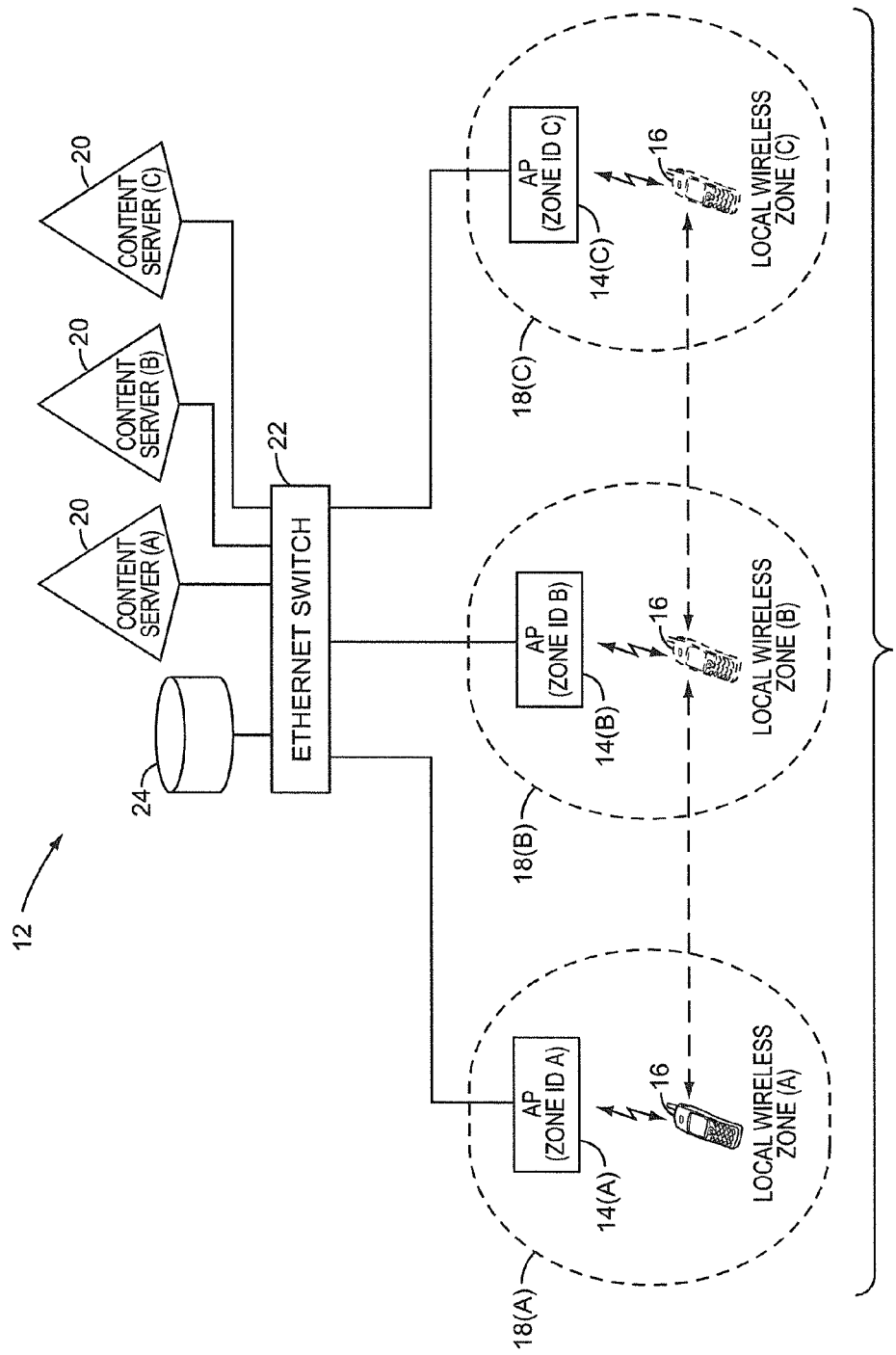
FIG. 6 is a block representation of a communication environment having three independent and non-overlapping local wireless zones according to a fifth embodiment of the present invention.

With reference to FIG. 6, a fifth embodiment of the present invention is illustrated, wherein multiple content servers 20A, 20B, 20C are provided. In this embodiment, each local wireless zone 18 has a unique zone ID. In this environment, the mobile terminal 16 may request content from different ones of the content servers 20 and do so using the unique zone identifier or a unique access point identifier. Accordingly, the location-based information from multiple content servers 20 may correspond to different types of applications or services made available to the mobile terminal 16. Those skilled in the art will recognize that the multiple applications or services may be afforded by a single content server 20, and thus not require multiple content servers 20 as illustrated.

Figure 7:
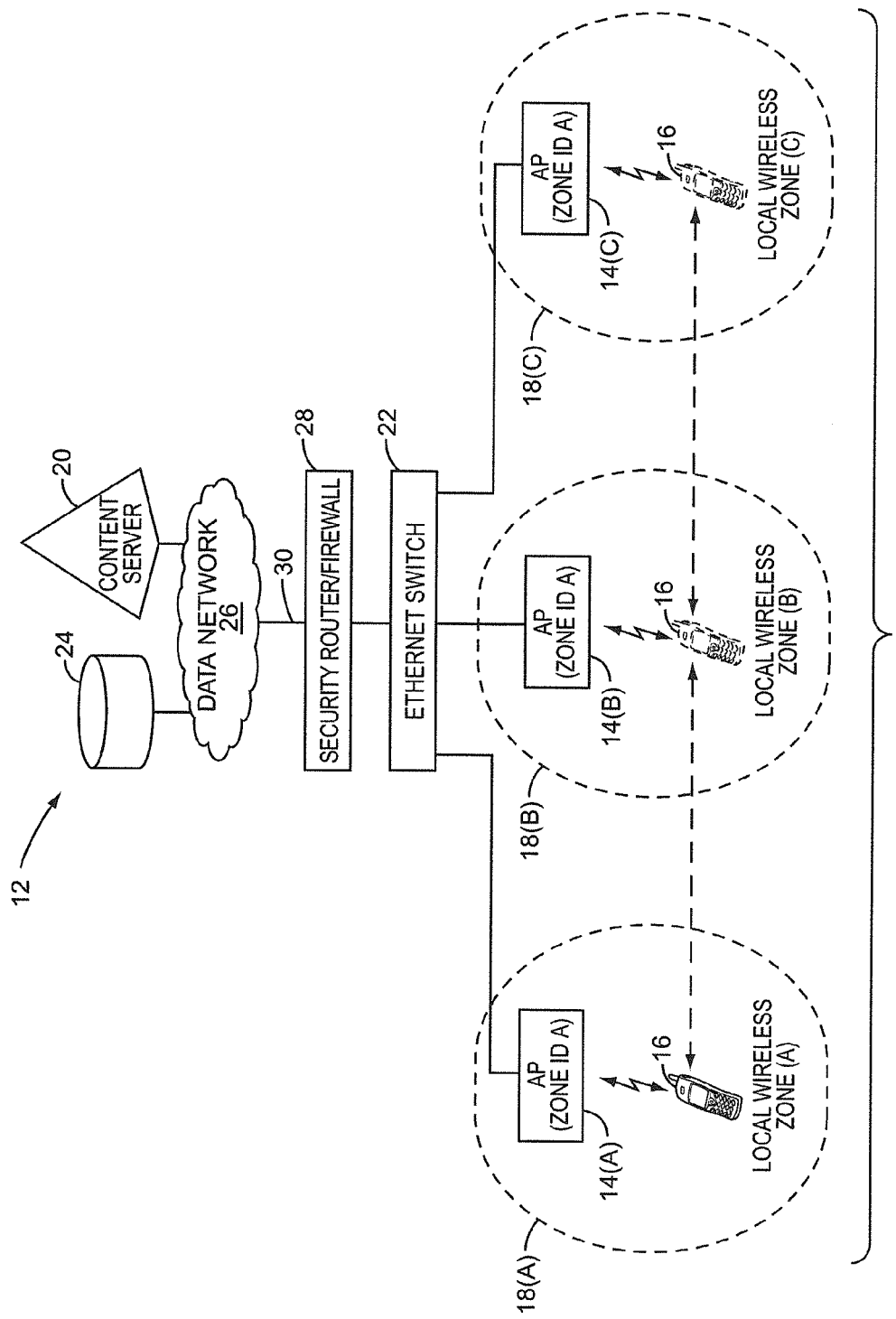
FIG. 7 is a block representation of a communication environment having three independent and non-overlapping local wireless zones according to a sixth embodiment of the present invention.

With reference to FIG. 7, a sixth embodiment of the present invention is illustrated wherein multiple local wireless zones 18 are supported by a content server 20 and access servers 24 over a data network 26 via a router or firewall 28, which provides for secure communications between the mobile terminal 16 and the content server 20. In one embodiment, a tunnel 30 is established between the router or firewall 28 and the content server 20 using layer 2 tunneling protocol (L2TP) or IPSec. As illustrated, the zone IDs are identical for each of the local wireless zones 18; however, those skilled in the art will recognize that unique zone IDs may be used as discussed above.

Based on the previous description, location-based information may be provided to a mobile terminal 16 in an efficient and effective manner using local wireless communication technology. The use of local wireless communications affords a more limited communication range, and thus, more accurate determination of a user's location. Further, the local wireless zones 18 afforded by the access points 14 may be controlled by controlling the transmit power for the respective access points 14. By adjusting the transmit power, the size of the local wireless zone 18 can be adjusted to accommodate the location requirements for providing the location-based information.

The location-based information may take many forms, including various types of communication services and web services. The location-based information may provide for basic content delivery associated with marketing, advertising, or other information services. The content may be sent using web-based protocols, file transfer protocols, streaming media, and real-time media.

In essence, the local wireless zones 18 would be established in association with public places, such that mobile terminals 16 moving within the local wireless zone 18 will have access to location-based information for corresponding applications or services. For example, the public place may be a restaurant, airport check-in station, or a museum exhibit. As such, the restaurant may provide coupons, advertisements, menu information, or may communicate with the mobile terminal 16 to make reservations or place orders. The user may cooperate with the mobile terminal 16 to facilitate check-in at the airport. Further, the mobile terminal 16 may communicate with various access points 14 throughout a museum to receive information from different exhibits corresponding to the various local wireless zones 18 afforded by the multiple access points 14 spread throughout the museum. As such, the location-based information may simply be streaming media describing artwork in each exhibit, wherein the mobile terminal 16 will travel from one exhibit to another and access different content based on its location. Further, the above description focuses on the mobile terminal 16 requesting the location-based information from the content server 20. Those skilled in the art will recognize that the concepts of the present invention are equally applicable to situations wherein the content server 20 will push information to the mobile terminal 16 upon learning of its presence within the local wireless zone 18.

Figure 8:
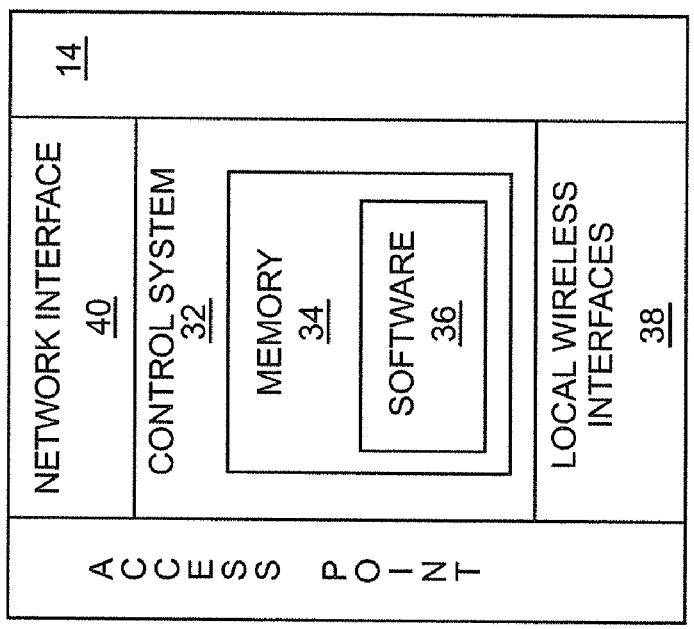
FIG. 8 is a block representation of an access point according to one embodiment of the present invention.

Turning now to FIG. 8, a block representation of an access point 14 is illustrated. The access point 14 is centered about a control system 32 having memory 34 with sufficient software 36 to effect operation as described above. The control system 32 will be associated with one or more local wireless interfaces 38 to facilitate local wireless communications with the mobile terminal 16, as well as a network interface 40 to facilitate communications with the various content servers 20 and access servers 24.

Figure 9:
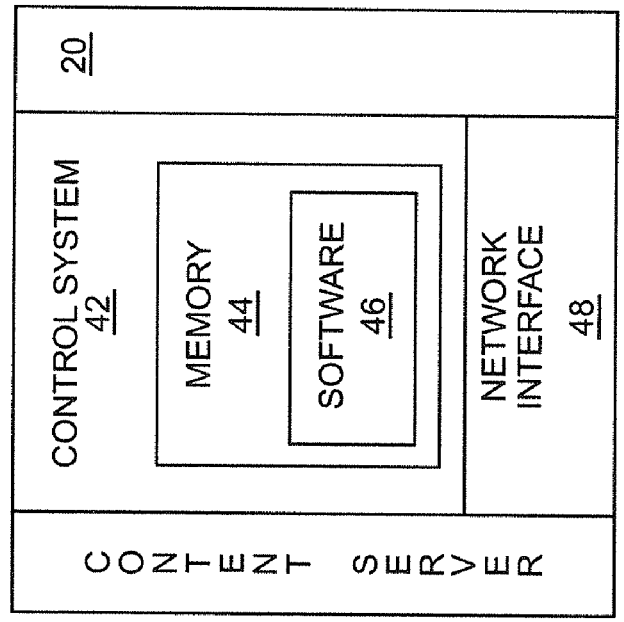
FIG. 9 is a block representation of a content server according to one embodiment of the present invention.

A block representation of a content server 20 is illustrated in FIG. 9. The content server 20 is centered about a control system 42 having memory 44 with sufficient software 46 to facilitate operation as described above. The control system 42 will be associated with a network interface 48 to facilitate communications with the access point 14 in order to receive requests from the mobile terminal 16 as well as send the location-based information to the mobile terminal 16.

Figure 10:
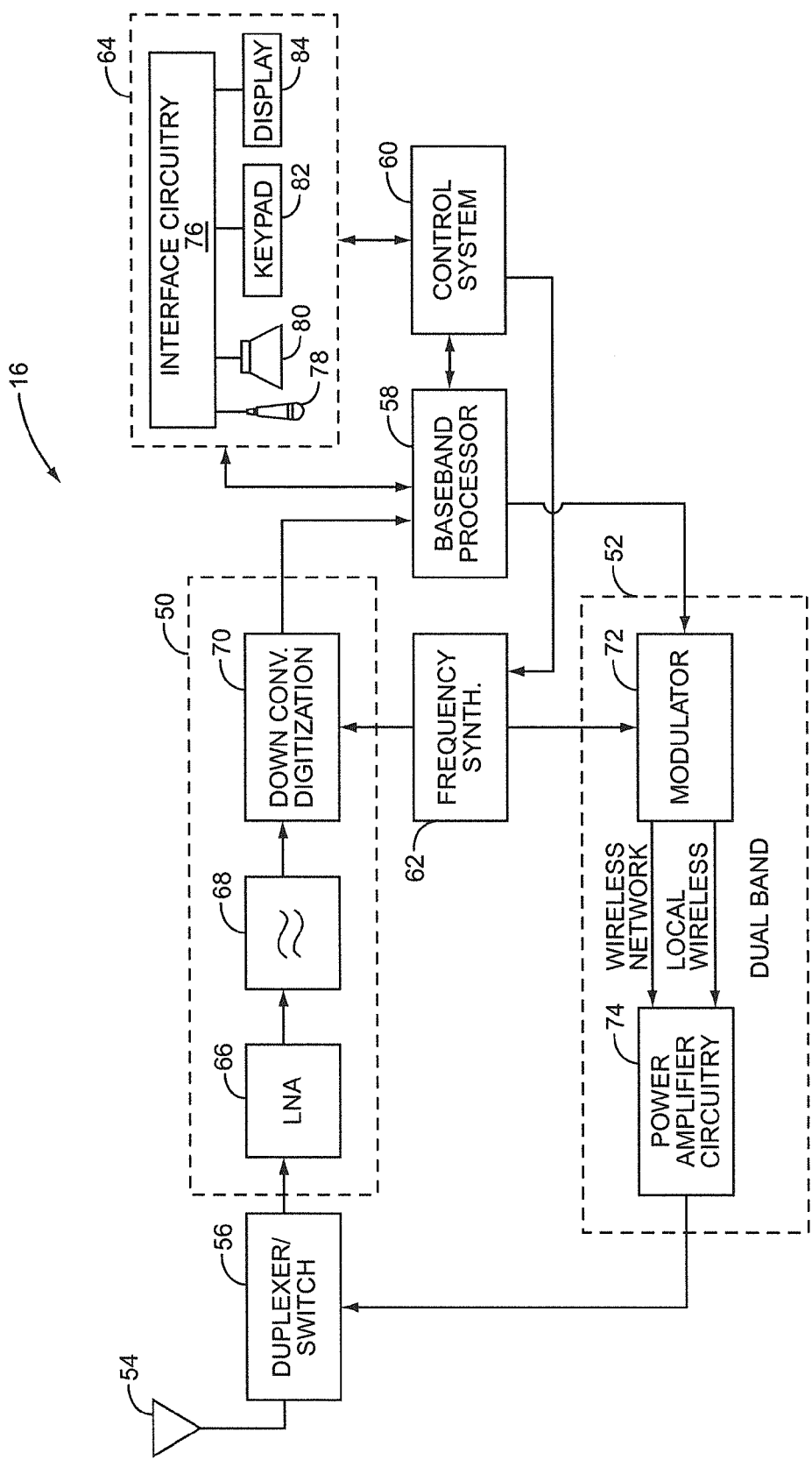
FIG. 10 is a block representation of a mobile terminal according to one embodiment of the present invention.

The basic architecture of the mobile terminal 16 is represented in FIG. 10. The mobile terminal 16 may take the form of any device capable of local wireless communications, such as a personal digital assistant, personal computer, or mobile telephone. In the illustrated embodiment, the mobile terminal 16 is configured to facilitate both local wireless and traditional cellular communications. The mobile terminal 16 may include a receiver front end 50, a radio frequency transmitter section 52, an antenna 54, a duplexer or switch 56, a baseband processor 58, a control system 60, a frequency synthesizer 62, and an interface 64. The receiver front end 50 receives information bearing radio frequency signals from one or more remote transmitters provided by a base station. A low noise amplifier 66 amplifies the signal. A filter circuit 68 minimizes broadband interference in the received signal, while downconversion and digitization circuitry 70 downconverts the filtered, received signal to an intermediate or baseband frequency signal, which is then digitized into one or more digital streams. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by a modulator 72 to modulate a carrier signal that is at a desired transmit frequency. Power amplifier circuitry 74 amplifies the modulated carrier signal to a level appropriate for transmission, and delivers the amplified and modulated carrier signal to the antenna 54 through the duplexer or switch 56.

As noted above, the mobile terminal 16 may be able to communicate with the access points 14 as well as with a cellular access network. Accordingly, the receiver front end 50, baseband processor 58, and radio frequency transmitter section 52 cooperate to provide either a cellular interface for the cellular access network and a connection to the local wireless interface 38 for the access point 14. These functions may be implemented using redundant circuitry, or by configuring common circuitry to operate in different modes. The configuration of the mobile terminal 16 will be dictated by economics and designer choice.

A user may interact with the mobile terminal 16 via the interface 64, which may include interface circuitry 76 associated with a microphone 78, a speaker 80, a keypad 82, and a display 84. The interface circuitry 76 typically includes analog-to-digital converters, digital-to-analog converters, amplifiers, and the like. Additionally, it may include a voice encoder/decoder, in which case it may communicate directly with the baseband processor 58. The microphone 78 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 76 into an analog signal suitable for driving the speaker 80. The keypad 82 and display 84 enable the user to interact with the mobile terminal 16, input numbers to be dialed, address book information, select local wireless zones, or the like.

Those skilled in the art will recognize improvements and modifications to the preferred embodiments of the present invention. All such improvements and modifications are considered within the scope of the concepts disclosed herein and the claims that follow.

What is claimed is:

1. A mobile terminal, comprising:
a communication interface operable to enable local wireless communications with an access point when present in a local wireless zone served by the access point;
a control system associated with the communication interface and operable to:
determine that the mobile terminal is within a first local wireless zone served by a first access point;
initiate communications with the first access point;
provide user identification to the first access point;
receive configuration data from the first access point;
request first location-based information from a first server associated with the first local wireless zone; and
receive the first location-based information from the first server associated with the first local wireless zone.

2. The mobile terminal of claim 1, wherein the control system is operable to:
determine that the mobile terminal is within a plurality of local wireless zones served by a plurality of respective access points;
select one of the plurality of local wireless zones; and
request second location-based information associated with the selected local wireless zone; and
receive the second location-based information associated with the selected local wireless zone.

3. The mobile terminal of claim 2, wherein the control system is operable to:
present the plurality of local wireless zones to a user of the mobile terminal; and
receive a response from the user corresponding to the selected local wireless zone.

4. The mobile terminal of claim 1, wherein the control system is operable to request the first location-based information from the first server associated with the first local wireless zone by sending a request comprising the user identification.

5. The mobile terminal of claim 1, wherein the user identification is input at the mobile terminal by a user of the mobile terminal.

6. The mobile terminal of claim 1, wherein the control system is operable to receive from the first access point configuration data comprising a zone identifier uniquely associated with the first local wireless zone.

7. The mobile terminal of claim 6, wherein the control system is operable to request first location-based information from the first server by sending a request comprising the zone identifier uniquely associated with the first local wireless zone.

8. The mobile terminal of claim 7, wherein the request comprises the zone identifier uniquely associated with the first local wireless zone and the user identification.

9. The mobile terminal of claim 6, wherein the zone identifier uniquely associated with the first local wireless zone comprises at least one of a domain name and an IP address.

10. A method of operating a mobile terminal, comprising:
determining that the mobile terminal is within a first local wireless zone served by a first access point;
initiating communications with the first access point;
providing user identification to the first access point;
receiving configuration data from the first access point;

requesting first location-based information from a first server associated with the first local wireless zone; and receiving the first location-based information from the first server associated with the first local wireless zone.

11. The method of claim 10, comprising:

determining that the mobile terminal is within a plurality of local wireless zones served by a plurality of respective access points;

selecting one of the plurality of local wireless zones; and requesting second location-based information associated with the selected local wireless zone; and receiving the second location-based information associated with the selected local wireless zone.

12. The method of claim 11, comprising:

presenting the plurality of local wireless zones to a user of the mobile terminal; and receiving a response from the user corresponding to the selected local wireless zone.

13. The method of claim 10, wherein requesting the first location-based information from the first server associated with the first local wireless zone comprises sending a request comprising the user identification.

14. The method of claim 10, wherein the user identification is input at the mobile terminal by a user of the mobile terminal.

15. The method of claim 10, comprising receiving from the first access point configuration data comprising a zone identifier uniquely associated with the first local wireless zone.

16. The method of claim 15, wherein requesting first location-based information from the first server comprises sending a request comprising the zone identifier uniquely associated with the first local wireless zone.

17. The method of claim 16, wherein the request comprises the zone identifier uniquely associated with the first local wireless zone and the user identification.

18. The method of claim 15, wherein the zone identifier uniquely associated with the first local wireless zone comprises at least one of a domain name and an IP address.

19. A mobile terminal for receiving location-based information in local wireless zones, the mobile terminal comprising:

a communication interface adapted to facilitate local wireless communications with access points when present within the local wireless zones;

a control system associated with the communication interface and adapted to:

determine that the mobile terminal is within a first local wireless zone served by a first access point, wherein the first local wireless zone is associated with a unique zone identifier;

use the unique zone identifier to select a first server associated with the first access point;

query the first server associated with the first access point to request first location based-information; and receive the first location-based information via the first access point from the first server associated with the first local wireless zone.

20. The mobile terminal of claim 19 wherein the control system is further adapted to:

a) determine that the mobile terminal is within a plurality of local wireless zones served by a plurality of access points are-possible:

b) select one of the plurality of local wireless zones; and c) receive second location-based information via the one of the plurality of local wireless zones.

21. The mobile terminal of claim 20 wherein the control system is further adapted to:

a) present the plurality of local wireless zones to a user of the mobile terminal; and b) receive a response from the user corresponding to the one of the plurality of local wireless zones.

22. The mobile terminal of claim 19 wherein the control system is further adapted to receive the unique zone identifier.

23. The mobile terminal of claim 19 wherein the control system is further adapted to:

a) send to a host server via the first access point a host configuration protocol request for configuration information bearing on communications between the mobile terminal and the first server; and b) receive the configuration information to facilitate communication between the mobile terminal and the first server.

24. The mobile terminal of claim 23 wherein the host configuration protocol request comprises the unique zone identifier.

25. The mobile terminal of claim 23 wherein the configuration information comprises an IP address for the first server from which the first location-based information is requested.

26. The mobile terminal of claim 23 wherein the control system is further adapted to:

a) send a domain name service request to a domain name server: and b) receive an IP address for the first server from which the first location-based information is requested.

27. The mobile terminal of claim 26 wherein the domain name service request comprises the unique zone identifier, and wherein the IP address is associated with the unique zone identifier.

28. The mobile terminal of claim 26 wherein the domain name service request comprises certain of the configuration information, and wherein the IP address is associated with the configuration information.

* * * * *